Figures 1, 7, 8:
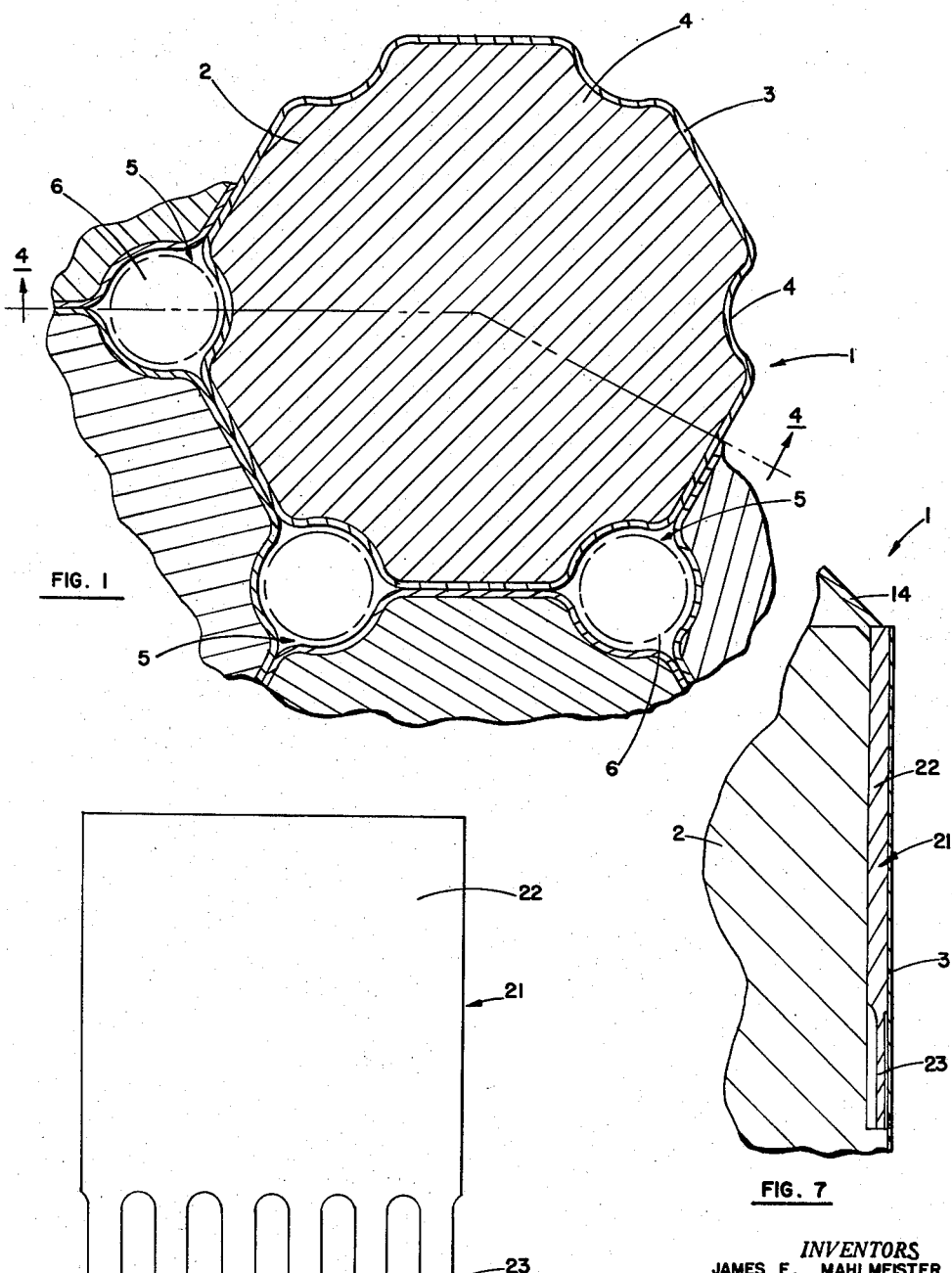

March 22, 1960  J. E. MAHLMEISTER ET AL  2,929,768
NUCLEAR REACTOR CORE DESIGN

Filed May 1, 1957  5 Sheets-Sheet 1

INVENTORS
JAMES E. MAHLMEISTER
WILLIAM S. PECK
WILLIAM V. HABERER
ARDELL C. WILLIAMS

BY Gerald A. Koris
ATTORNEY

March 22, 1960    J. E. MAHLMEISTER ET AL    2,929,768
NUCLEAR REACTOR CORE DESIGN
Filed May 1, 1957                                    5 Sheets-Sheet 2

*INVENTORS*
JAMES E. MAHLMEISTER
WILLIAM S. PECK
WILLIAM V. HABERER
ARDELL C. WILLIAMS

BY *Gerald A. Koris*
ATTORNEY

INVENTORS
JAMES E. MAHLMEISTER
WILLIAM S. PECK
WILLIAM V. HABERER
ARDELL C. WILLIAMS
BY Gerald A. Koris
ATTORNEY

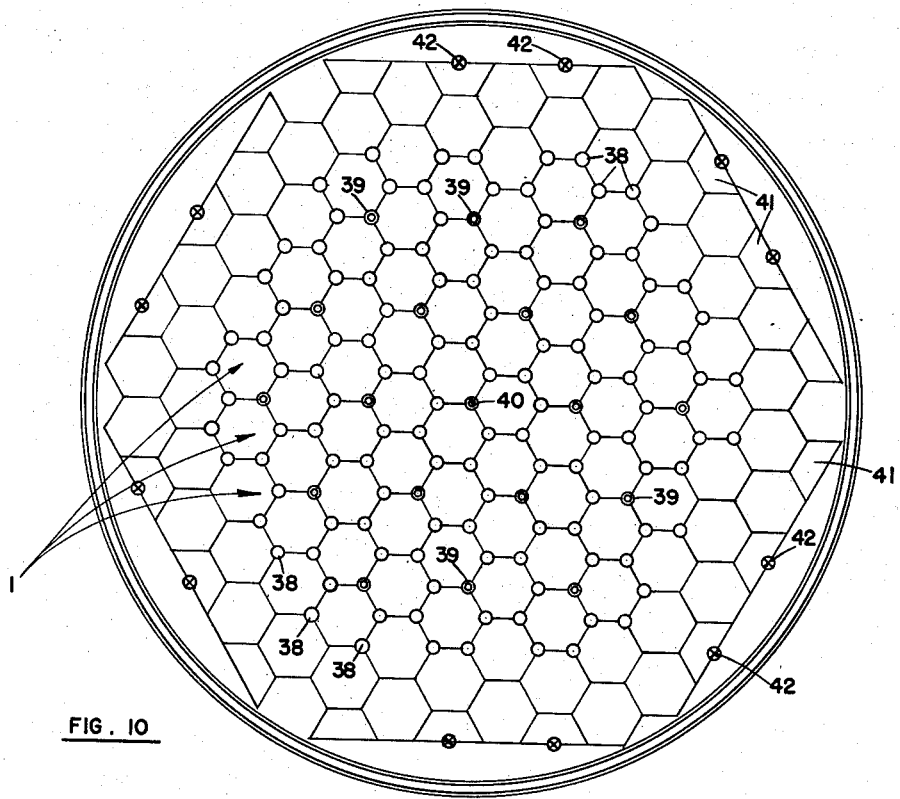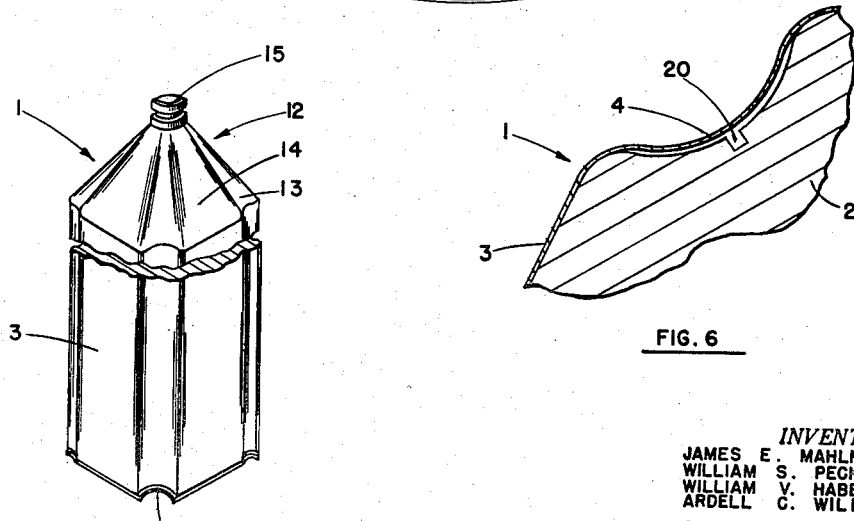

March 22, 1960

J. E. MAHLMEISTER ET AL 2,929,768

NUCLEAR REACTOR CORE DESIGN

Filed May 1, 1957

5 Sheets-Sheet 5

INVENTORS
JAMES E. MAHLMEISTER
WILLIAM S. PECK
WILLIAM V. HABERER
ARDELL C. WILLIAMS

BY Gerald A. Koris

ATTORNEY

United States Patent Office 2,929,768
Patented Mar. 22, 1960

2,929,768
NUCLEAR REACTOR CORE DESIGN

James E. Mahlmeister, Van Nuys, William S. Peck, Pacoima, William V. Haberer, Burbank, and Ardell C. Williams, Canoga Park, Calif., assignors, by mesne assignments, to the United States of America as represented by the United States Atomic Energy Commission Application May 1, 1957, Serial No. 656,369

10 Claims. (Cl. 204—193.2)

Our invention relates to an improved nuclear reactor core design, and more particularly to an improved core design for a sodium graphite reactor.

For information concerning the theory, construction and operation of nuclear reactors, reference is made to U. S. Patents 2,708,656 and 2,714,577, Fermi et al.; and to vols. 2, 3 and 9 of "The proceedings of the International Conference on the Peaceful Uses of Atomic Energy," held in Geneva, Switzerland, August, 1955, published by United Nations.

For specific information concerning the sodium graphite-type reactor, reference is made to the Geneva papers of W. E. Parkins, "The Sodium Reactor Experiment," vol. 3; Sidney Siegel et al., "Basic Technology of the Sodium Graphite Reactor," vol. 9; and Chauncey Starr, "The Sodium Graphite 75,000 Electrical Kilowatt Power Plant," vol. 3.

As indicated in these papers, the unit cell of the core of the completed Sodium Reactor Experiment (SRE) and the projected full scale Sodium Graphite Reactor (SGR) comprises a hexagonal block of graphite clad with zirconium. A central channel runs through the block; the fuel element (a cluster of seven ¾" rods) is positioned in this process tube and the sodium coolant flows through it removing fission heat.

There are several drawbacks to this type of unit cell or "can" design. Zirconium was used as the cladding in the SRE in the place of stainless steel, principally because of its lower neutron absorption cross-section. There are, however, a number of drawbacks attending the use of zirconium. Zirconium is more expensive than stainless steel, and is considerably more difficult metallurgically. Zirconium will react very readily with oxygen to form a brittle compound and extreme care is followed in the SRE, through the use of both cold and hot traps, to reduce the oxygen content of sodium to a few parts per million. Zirconium is similarly reactive with hydrogen. The elevated temperature strength characteristics of zirconium leave something to be desired; the operating mixed mean outlet temperature of the reactor is, in part, limited by this.

Another drawback of the present can design is that only one fuel rod cluster can be used per can. This means that to obtain a given lattice spacing more cans must be constructed and provided with cladding. This increases fabricational costs and adds more neutron absorber material to the core, thereby reducing neutron economy (zirconium, while of lower cross-section than stainless steel, is still an important neutron absorber). Another drawback of the SRE design is that the moderator region adjacent the fuel element cluster is cooled by the same sodium as the fuel cluster, although its temperature is not nearly as great. Thermal stresses may result from this, particularly upon reactor shutdown when the sodium temperature changes at a high rate.

Finally, and most important, there are disadvantages to this design from the neutron physics viewpoint. The thermal neutron flux is found to peak at the can edge, just where the content of neutron absorbing cladding is greatest. (The fast neutrons released upon fission in the central process channel pass into the graphite and are moderated by the time the can edge is reached.) Therefore, the neutron economy of this system suffers.

In view of the shortcomings of the present can design, an object of our present invention is to provide an improved reactor core design.

Another object is to provide an improved unit cell or "can" for a reactor core.

Another object is to provide such a can which achieves improved neutron economy.

Another object is to provide such a can which is relatively easy to manufacture and is structurally sound.

Still another object is to provide a reactor core design in which the total amount of neutron absorber material in the core is at a minimum.

Still another object is to provide a core design for an SGR which achieves the same neutron economy with stainless steel structural material as previously obtained in other designs with zirconium.

A further object is to provide a core design for an SGR in which the fuel element and moderator are separately cooled in order to reduce possible thermal fatigue failure.

Yet another object is to provide a core design for an SGR employing fewer number of unit cells while maintaining the same center-to-center lattice spacing of fuel elements as in previous designs.

Further objects and advantages of our invention will become apparent from the following detailed description, taken together with the accompanying drawings and the attached claims.

Figure 4:
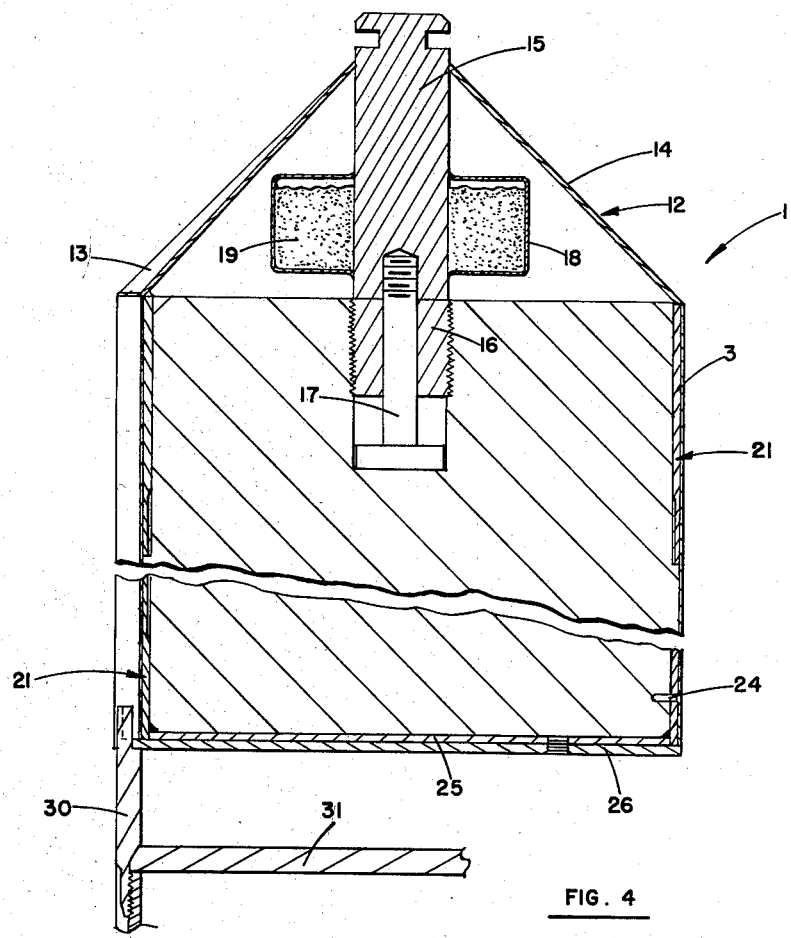
Figure 2:
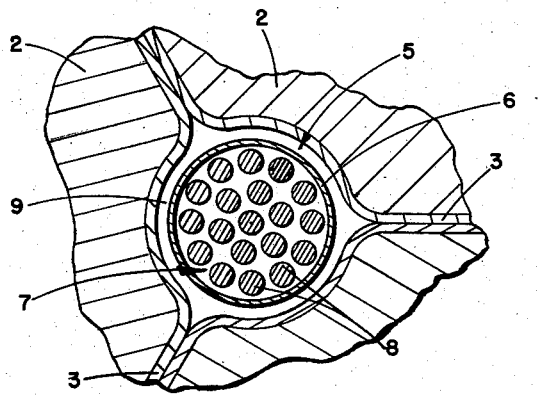
Figure 3:
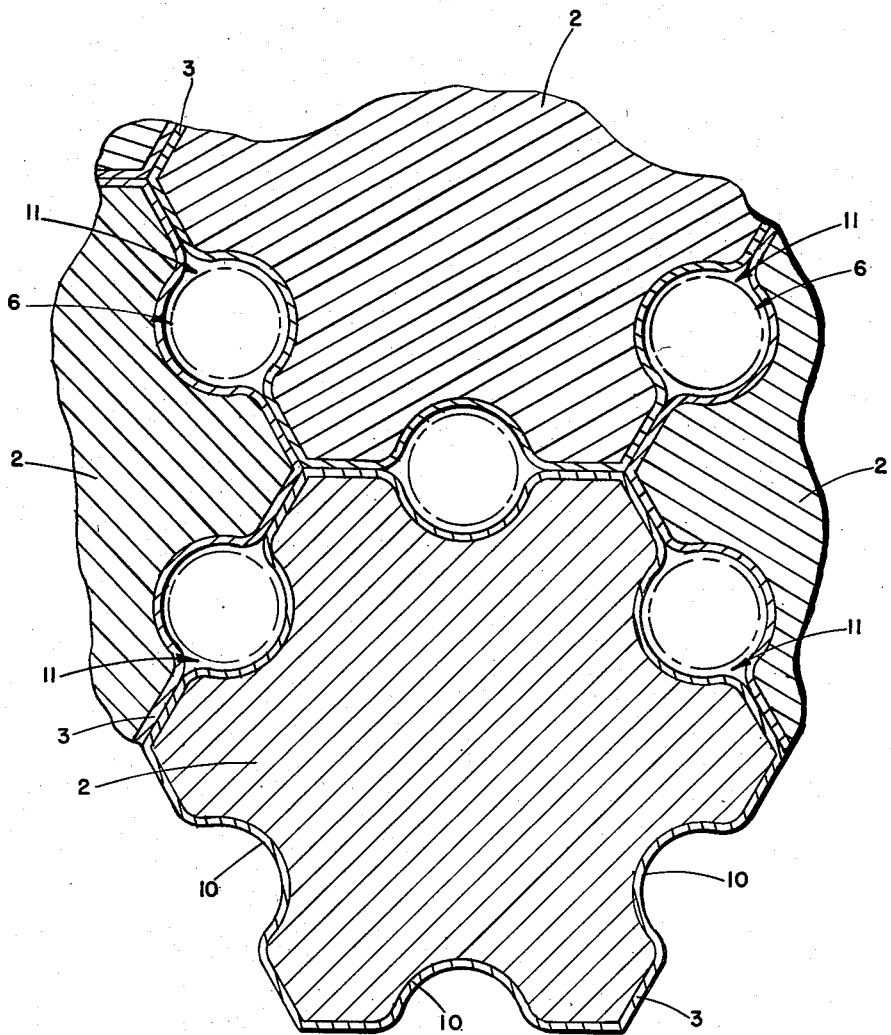
Figure 9:
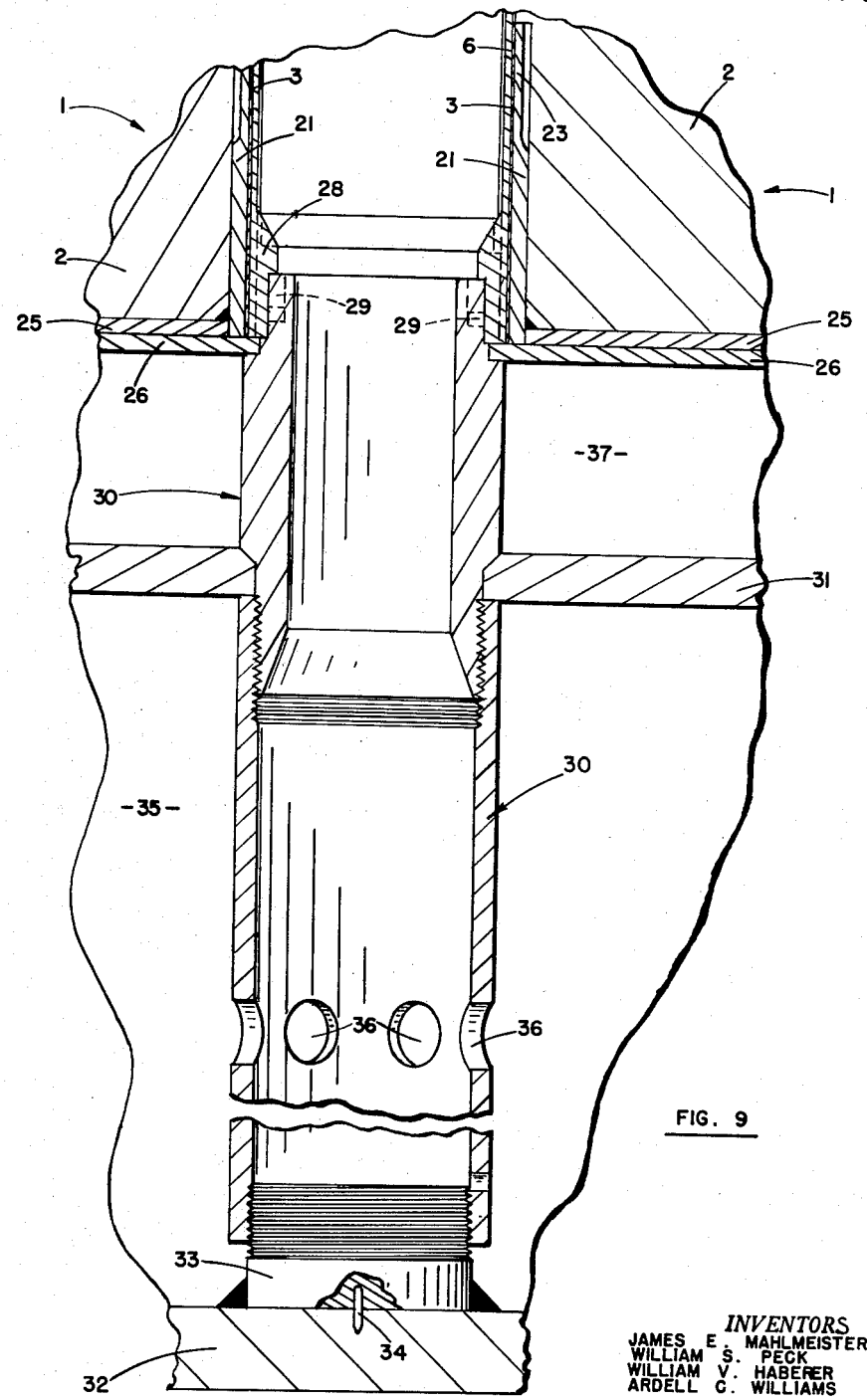

In the drawings, Fig. 1 is a section of our can, Fig. 2 is an enlargement of a portion of Fig. 1, Fig. 3 is a section of an alternate can design, Fig. 4 is a vertical section of Fig. 1, Fig. 5 is a perspective view of the can of Fig. 1, Fig. 6 is an enlarged portion of Fig. 4, Fig. 7 is another enlarged portion of Fig. 4, Fig. 8 is a front view of a member shown in Fig. 7, Fig. 9 is a vertical sectional view showing insertion of the can into the reactor core supporting means, and Fig. 10 is an overall core arrangement using our can assembly.

Referring now to Fig. 1, we see a sectional view of one embodiment of our new can. The can 1 comprises a graphite block 2 with a thin sheathing 3 of a suitable corrosion-resistant metal or alloy with reasonably good nuclear characteristics, such as zirconium, stainless steel, titanium and Inconel. There is no central process channel for placement of the fuel element, as in the SRE design; instead, each corner of the can has a longitudinal scallop 4, amounting to a cut of approximately 120°. (While we will here speak of hexagonal cans, the edge-loaded design principle of our invention applies equally well to other geometrical shapes, such as squares and octagons. Similarly the edge-loaded principle is applicable to other heterogeneous cores with aqueous, organic and gas coolants, and with other solid moderators such as beryllium and metal hydrides.) As noted in the drawing, three such adjacent cans combine to form one channel 5. While this figure shows each corner having rounded edges, straight corners may also be satisfactorily used. As shown in Fig. 2, an enlarged view of channel 5, a thin-walled, annular process tube 6, of the same material as the cladding, is disposed in the channel formed by three adjacent cans. The process tube 6 is not physically attached to can 1. (Its holding means are described later.) Because the process tube is mechanically independent of moderator sheath 3, thermal shrinkage will not cause interaction stresses. The fuel element 7 is located within the process tube 6 in the region of high sodium velocity. This fuel element may satisfactoritly be a cluster of rods 8, such as the 19-rod cluster described in the paper of C. Starr, supra; a single, hollow element; or another suitable element. The moderator 2 is cooled by sodium flowing in the annulus 9 between process tube 6 and moderator sheath 3 at a lower flow rate. Thus, with this design, fuel element 7 and moderator 2 are cooled separately in accordance with their heat removal requirements. Sodium flow into process tube 6 and into annulus 9 is separately controlled by means such as valves or orifices.

An alternate edge-loaded design is shown in Fig. 3. In this design the longitudinal scallop 10 is made in the center of each side of the hexagon, amounting to 180°. Two such cans then form a complete channel 11, as shown. An advantage of this version over the corner cut design shown in Figs. 1 and 2 is that for a given can size, approximately 50% more fuel loading can be had. For a given lattice spacing of fuel elements, a larger can can be used. Hence, a fewer number of such cans and less neutron absorbing cladding is possible for a given core. Each of these designs is a clear improvement over the SRE design, and a firm choice cannot be made between them.

The basic can may be fabricated in a number of different ways, and one particular method is not critical. With the relatively thin cladding (e.g. 10 mils), working of the metal is relatively easy. In one satisfactory method, high quality graphite is machined to the proper hexagonal shape with edge scallops. The cladding is then fabricated in two halves, the concave portions being formed on a die; the two portions are then placed around the graphite block and welded together. In another method, the cladding is placed loosely around the can, welds made, and the metal drawn into shape around by the can in the proper design by taking a vacuum on the graphite. Other features of the can design may suitably be the same as for the SRE. For example, a "snorkel" tube may be attached from the top of the can to the inert gas atmosphere over the top sodium plenum to vent any gases building up on the graphite during reactor operation, in order to maintain the same pressure as in the inert gas atmosphere.

While the present edge-loaded can design may be satisfactorily used with the basic SRE can, certain improvements therein are desirable. For example, elimination of can head flexing upon reactor shutdown would be desirable. In the SRE, as the reactor power is suddenly reduced, the can top remains at the normal sodium exit temperature of 960° F. because of a large stagnant pool of sodium in the plenum above the core. The sodium coming up the fuel channel, however, is suddenly no longer heated by the fuel rods, so that the entire tube is quickly cooled to the inlet temperature of 500° F. The fuel channel contraction in this situation places stress on the tube-to-plate weld and could subject this to fatigue failure. Such flexing is minimized in the design shown in Fig. 4. As shown in Fig. 4 and in the perspective of Fig. 5, we see that a can head 12 is provided in the shape of a hexagonal pyramid with the corners 13 of the pyramid scalloped to match the can corner scallops 4. The head comprises metal sides 14 and a central rod 15 extending above the head, which serves as a pick-up rod for inserting and removing the can from the reactor. Rod 17 is fitted with a graphite plug 16 which is screwed into the graphite log. Rod 17 is screwed into the central rod 15. A container 18 is welded to rod 15 and contains therein a granulated "getter" 19, such as zirconium sponge, titanium or zirconium-titanium alloy. This material, which is located in a high temperature region of the reactor, acts as a gas absorber for the radiolytically and thermally released gases. Through this device, a negative pressure, in relation to the external environment, is always maintained and flexing of the cap is avoided.

Access of gases to the zirconium is through a small peripheral, longitudinal slot 20 (approx. ½ inch) provided in graphite 2, as shown in Fig. 6, near cladding 3.

Instead of a pyramidal head at flat head containing the zirconium sponge may be used.

To allow for the effects of differential growth of the graphite and the metal cladding when the reactor reaches power without can rupture (stainless steel will expand at a greater rate than graphite), differential expansion means is provided. It is shown in Fig. 4 in the form of a comb 21, positioned inside cladding 3 at the top and bottom of the can. The comb 21 is shown enlarged in Fig. 7 and sectioned in Fig. 8. The face 22 of comb 21 is considerably thicker than cladding 3. The comb couples, at its teeth 23 with the graphite and the interlocking effect allows for differential axial expansion. At the top of the can the comb has its teeth directed downwardly, and the teeth of the bottom comb are directed upwardly. A pin 24 (Fig. 4) is driven through bottom comb 21 into the graphite body to hold the bottom plate 25 in the event of rupture of the cladding 3.

The manner in which the process tube is held may be seen with reference to Figs. 4 and 9. It is noted that the can bottom plate 25 is welded to a base plate 26. The base plate 26 is flush with can bottom plate 25 except at the scalloped corners where a slight lip 27 (Fig. 5) protrudes. It is upon lip 27 that process tube 6 is positioned. Bayonet-type bottom portion 28 of tube 6 engages slot 29 of supporting pedestal 30 to lock the process tube in position. Fig. 9 indicates the fitting adjacent cans 1 into the bottom of the reactor. It is noted that adjacent cans 1 are supported by pedestal means 30 which in turn is supported by the bottom grid plate 31 through which it passes to the reactor core tank bottom 32. The pedestal 30 is screwed into a boss 33 at the core tank bottom. The boss in turn is located by a dowel 34 when it is welded to the core tank bottom 32. The region between the core tank bottom and the grid plate constitutes the bottom sodium plenum chamber 35 of the reactor. Flow into the process tube for cooling of the fuel elements is accomplished through orifices 36 provided in the bottom pedestal. Moderator cooling is achieved by allowing high pressure sodium from bottom plenum chamber 35 around bottom grid plate 31 into chamber 37. The coolant flow through the process tubes is controlled by the orifice sizing and the moderator flow is controlled by moderator coolant off-on valves which are located in the reflector region and controlled from the upper surface of the top shield.

In Fig. 10, we see an overall core arrangement of our reactor. This shows that the core has as fuel elements, 123, 19 rod clusters 38, 18 control and safety rods 39 (10 control and 8 safety), one neutron source (antimony oxide-beryllium) 40, 108 full moderator and reflector cans and 18 half cans, and 12 moderator coolant control valves 42.

The following is a specific example of our invention. Except as indicated, the details of the sodium graphite reactor with uranium metal fuel of C. Starr's Geneva paper apply. The can is that shown in Figs. 1, 2, 4–9 and the core design is that shown in Fig. 10.

*Core dimensions*

| | |
|---|---|
| Lattice type | Hexagonal. |
| Lattice cell size | 16.3 inches (across flats). |
| Number of process channels for fuel | 123 |
| For dummy elements | 12 |
| For neutron source | 1 |
| For control and safety | 18 |
| Total | 154 |
| Nominal reflector thickness | 2 feet. |
| Core diameter (including reflector) | 16 feet. |
| Core height (including reflector) | 14 feet. |
| Moderator and reflector elements | 108 full elements, 18 half elements. |

The following are the dimensions of the moderator, reflector and process tubes in the above indicated core. The graphite moderator sheath is 0.018 inch stainless steel sheet fabricated into a hexagonal shape approximately 16 inches across the flats by 14 feet long. The corners of the hexagonal can are scalloped to form a 2 inch radius scallop at each corner. This can is welded to the top and bottom heads to form a gas tight container. The can head is formed from 1/8 inch stainless steel sheet, and is formed to shape a frustrum of a hexagonal pyramid approximately 7 inches high, with the edges of the pyramid formed to a cone shape scalloped to match the can corner scallops. The head is welded to a 1/4 inch steel plate 8 inches in depth which is fabricated to a dimension 3/16 inch smaller across the flats than the steel shell. The bottom 2 inches of this plate is machined on the inside to a thickness of 1/8 inch. This area is then machined to form a comb arrangement of the bottom 2 inches with 1/2 inch wide teeth and 1/2 inch wide spaces. The base of the can is made up of two 1/4 inch steel plates plug welded together. A 1/4 inch steel plate 5 inches in depth is welded to the upper plate. This plate is machined to form a comb arrangement similar to the head. The lower plate projects 1/4 inch beyond the can sides at each scallop. These projections rest on the support structure and are locked down by the process tube. A container of approximately 4 pounds of granulated zirconium sponge is welded to the pick-up rod in the head of the can. The pick-up rod extends approximately 2 inches above the can and is fitted with a graphite plug screwed into the graphite log. Fourteen feet long moderator and reflector elements are fabricated by keeping together 4 foot lengths of graphite. The process tube is approximately 3.86 inches outside diameter by 15 feet long. The wall thickness is 15 mils in the core and reflector area. A bayonet type lock is provided at the bottom of the tube to lock it in position. This lock engages with the core support structure. All materials for the can and its miscellaneous parts are fabricated entirely from Type 304 stainless steel.

The control rods permit an estimated 10% control and reactivity which is adequate to handle reactivity changes associated with temperature, poisons, and fuel depletion. Each control element operates in a thin-wall steel thimble which extends from the top of the top shield down through the core. The thin-wall thimble, which is cooled by the moderator coolant, encloses a poison column which is made up of boron-nickel alloy rings. The rings are suspended on a steel pull tube whose motion will be controlled by the motorized driving mechanism. The driving mechanism is located above the top shield. The safety elements with a total reactivity of approximately 9% are provided in the core. The safety elements operate within thimbles similar to those used for the control elements. An electromagnet pulls the safety rods as well as being able to release the rods any time regardless of their position. The magnet is raised and lowered by a chain and sprocket coupled to a gear reduction motor unit. The rods will fall into the core by gravity. An impact snubber is provided in conjunction with each rod to decelerate it through the last portion of its fall. The control and safety rods are conventional and no invention is claimed therein.

The above example is merely illustrative and not restrictive of our invention. The edge-loaded design principle for a heterogeneous core is inherently broad and is generally applicable to other construction materials and fuels. Therefore, our invention should be understood as limited only by the appended claims.

Having thus described our invention, we claim:

1. A nuclear reactor core which comprises a plurality of moderator cans, each of said cans comprising a solid hexagonal graphite block clad in stainless steel with a longitudinal scallop at the corners of said hexagon, the adjoining corners of three of said cans combining to form a process channel; and fuel elements positioned in said channels.

2. A core for a sodium graphite nuclear reactor, which comprises a plurality of adjoining moderator cans, each of said cans comprising a solid hexagonal graphite block clad in a metal selected from the group consisting of stainless steel, titanium, Inconel, and zirconium, a peripheral, longitudinal scallop for each side of said hexagon, the adjoining scallops of a plurality of said cans combining to form a plurality of process channels; process tubes positioned in said channels; and a fuel element positioned in each said process tube.

3. The core of claim 2, wherein said metal is stainless steel.

4. The reactor core of claim 2, wherein said scallops are at the corners of said hexagon, the adjoining corners of three of said hexagons combining to form a process channel; and wherein said fuel element is a cluster of fuel rods containing uranium enriched in U-235.

5. A moderator element for a sodium graphite reactor, which comprises a hexagonal block of solid graphite clad with a sodium corrosion-resistant metal of relatively low thermal neutron absorption cross section peripheral longitudinal scallops in said block, a cap attached to said block and a gas absorber contained in said cap.

6. The moderator can of claim 5, wherein said cap defines a pyramidal hexagon the edges of said pyramidal hexagon being scalloped to match said scallops of said block, said gas absorber is granulated zirconium and said metal is stainless steel.

7. The moderator element of claim 5, wherein the bottom thereof has a plate attached thereto, said plate protruding from said element at said scallops, said protrusion being adapted to engage a process tube positioned in said scallop but physically separated from said moderator can.

8. A moderator element for a sodium graphite reactor, which comprises a multi-sided block of solid graphite having a plurality of peripheral, longitudinal scallops, said graphite clad on all exterior surfaces with a sodium corrosion resistant metal of relatively low thermal neutron absorption cross section, comb means defining a plurality of spaced teeth inserted at the longitudinal ends of said block between said cladding and said graphite and connected to said end cladding, said combs positioned with said teeth inwardly, longitudinally directed, and graphite slideably filling the keyways defined by said teeth.

9. A moderator element for a sodium graphite reactor, which comprises a solid, hexagonal block of graphite, peripheral, longitudinal recesses at each edge of said hexagon, said block clad on all exterior surfaces with stainless steel, stainless steel combs having a plurality of spaced teeth inserted between said cladding and said graphite at the longitudinal ends of said block, said combs being joined to said longitudinal end cladding and positioned with said teeth inwardly directed parallel to the side cladding of said graphite blocks, and graphite slideably filling the keyways defined by said teeth.

10. The moderator element of claim 8, wherein a gas getter is positioned at an end of said graphite block adjacent said end cladding.

References Cited in the file of this patent

UNITED STATES PATENTS

| | | |
|---|---|---|
| 2,743,226 | Newson | Apr. 24, 1956 |
| 2,774,730 | Young | Dec. 18, 1956 |
| 2,780,596 | Anderson | Feb. 5, 1957 |

OTHER REFERENCES

"Proceedings of the International Conference on the Peaceful Uses of Atomic Energy," vol. 9, page 322; vol. 3, pages 98–114, 300–302. Held in Geneva August 8–20, 1955. Published by United Nations, N.Y. (1956).

"Nucleonics," vol. 14, No. 3, March 1956, page 37.